United States Patent
Morrow et al.

(10) Patent No.: US 6,604,571 B1
(45) Date of Patent: Aug. 12, 2003

(54) EVAPORATIVE COOLING OF ELECTRICAL COMPONENTS

(75) Inventors: Ernest J. Morrow, Monticello, FL (US); Sally M. Sellers, Tallahssee, FL (US); Gary D. Knudsen, Tallahassee, FL (US)

(73) Assignee: General Dynamics Land Systems, Inc., Sterling Heights, MI (US)

(*) Notice: Subject to any disclaimer, the term of this patent is extended or adjusted under 35 U.S.C. 154(b) by 0 days.

(21) Appl. No.: 10/120,567

(22) Filed: Apr. 11, 2002

(51) Int. Cl.$^7$ .................................................. F28D 7/02
(52) U.S. Cl. ........................ 165/104.21; 165/104.33; 361/700; 174/15.1; 257/715
(58) Field of Search ............ 165/80.4, 104.33; 361/699, 700; 174/15.1, 15.2; 257/714–716

(56) References Cited

U.S. PATENT DOCUMENTS

| | | | |
|---|---|---|---|
| 3,851,221 A | * 11/1974 | Beaulieu et al. ............ 165/80.4 |
| 4,120,021 A |   10/1978 | Roush |
| 4,302,793 A | * 11/1981 | Rohner ........................ 361/385 |
| 4,352,392 A |   10/1982 | Eastman |
| 4,437,082 A | *  3/1984 | Walsh et al. ................ 174/15.2 |
| 4,694,323 A | *  9/1987 | Itahana et al. ............. 165/80.4 |
| 4,967,829 A |   11/1990 | Albers et al. |
| 5,099,908 A | *  3/1992 | Taraci et al. ............ 165/104.33 |
| 5,212,626 A | *  5/1993 | Bell et al. .................... 361/385 |
| 5,220,804 A |    6/1993 | Tilton et al. |
| 5,718,117 A |    2/1998 | McDunn et al. |
| 5,761,035 A |    6/1998 | Beise |
| 5,768,103 A |    6/1998 | Kobrinetz et al. |
| 5,831,824 A |   11/1998 | McDunn et al. |
| 5,907,473 A |    5/1999 | Przilas et al. |
| 5,924,482 A |    7/1999 | Edwards et al. |
| 5,943,211 A |    8/1999 | Havey et al. |
| 5,999,404 A |   12/1999 | Hileman |
| 6,060,966 A |    5/2000 | Tennant et al. |
| 6,108,201 A |    8/2000 | Tilton et al. |
| 6,163,073 A |   12/2000 | Patel |
| 6,404,297 B2 | * 6/2002 | Cherniski et al. ............. 333/12 |

OTHER PUBLICATIONS

Fluorochemicals in Heat Transfer Applications, Frequently Asked Questions.
3M™ Fluorinert™ Electronic Liquid FC–77, Issued: 03/99; 98–0212–2169–6(HB); www.3m.com/market/industrial/fluids/library/prodinfo/FC77.html.
3M Specialty Fluids: Reference Library www.3m.com/market/industrial/fluids/library/reflib.html.
Whistler, Richard J., Power Distribution, PCIM Magazine, Power Electronic Systems, Jun. 1999.
The Website For The Chemicals Industry; Chemicals Technology—3M—Fluorochemicals for Heat Transfer Systems; www.chemicals-technology.co...ractors/heattransfer/3m/index.html.

* cited by examiner

*Primary Examiner*—Terrell McKinnon
(74) *Attorney, Agent, or Firm*—Brooks & Kushman P.C.

(57) ABSTRACT

The invention is a method for increasing the capacity of an electrical component, such as a bus bar, to carry an electrical current. The method comprises the step of exposing the electrical component to an evaporative fluid that is in fluid and thermal contact with the electrical component. Upon heating, fluid undergoes a phase change at least partially to a vapor state. Thus, electrical energy in the form of heat generated by the flow of current is dissipated at least partially by the evaporative fluid. As a result, the temperature of the electrical component is maintained within an acceptable range when carrying the electrical current.

7 Claims, 2 Drawing Sheets

EVAPORATIVE COOLING OF ELECTRICAL COMPONENTS

BACKGROUND OF THE INVENTION

1. Field of the Invention

This invention relates to a cooling method for electrical devices which require control of their operating temperature for effective functioning.

2. Background Art

Power can be distributed in many ways in electronic systems. Power distribution in a high current environment (e.g., 25–2,500 amps) requires moving the current from a power supply to various components, such as amplifiers, rectifiers, routers, servers, etc. Among the more common methods used are those that involve heavy gauge wire and cable, circuit boards, and copper bus bars.

Historically, solutions to power distribution have involved one or more heavy copper bus bars that are provided with holes for connecting cables. Typically, the bars might be spaced apart from each other and be isolated by insulating spacers. Large copper or aluminum bus bars and cables have been used for years to distribute power within industrial control and telecommunication cabinets. They are large and can carry high power relatively easily. Traditionally, if the bus bars became hot from excessive current, more air was moved within a cabinet to cool them. If the bars were uninsulated (and thus perilous to the touch), they tended to be located remotely for safety reasons. In such a setting, cables were run to connect the bars to the components.

Today, however, the quest continues for higher power in smaller packages. It would be desirable to engineer power distribution systems that can operate at higher temperatures so that more power can be distributed within a system.

Additionally, the packaging engineer contends with the problems of air flow and ventilation, vibration, noise, and efficient use of space.

In light of problems that are unsolved by previous approaches, it would be desirable to provide a cooling system for electrical components or conductors such as bus bars that increase the current-carrying capacity of the bus bar, while reducing its size, thereby saving space and weight.

Illustrative of prior art approaches is an evaporative spray coolant for cooling a heat source as described in U.S. Pat. No. 5,220,804, which issued on Jun. 22, 1993.

SUMMARY OF THE INVENTION

The invention is a method for increasing the capacity of an electrical component, such as a bus bar, to carry an electrical current. The method comprises the steps of exposing the electrical component to an evaporative fluid that is in fluid and thermal contact with the electrical component. A portion of the fluid undergoes a phase change to a vapor state. The hot component surface heats the fluid to its vaporization point. This results in an amount of heat transferred that is proportional to the latent heat of vaporization of the vaporized mass. Thus, heat generated by the flow of current is dissipated at least in part by the evaporative fluid. Accordingly, the temperature of the electrical component is maintained while carrying an increased electrical load because heat is dissipated at a rate comparable to that at which it is produced.

DETAILED DESCRIPTION OF THE PREFERRED EMBODIMENTS

Figure 1:
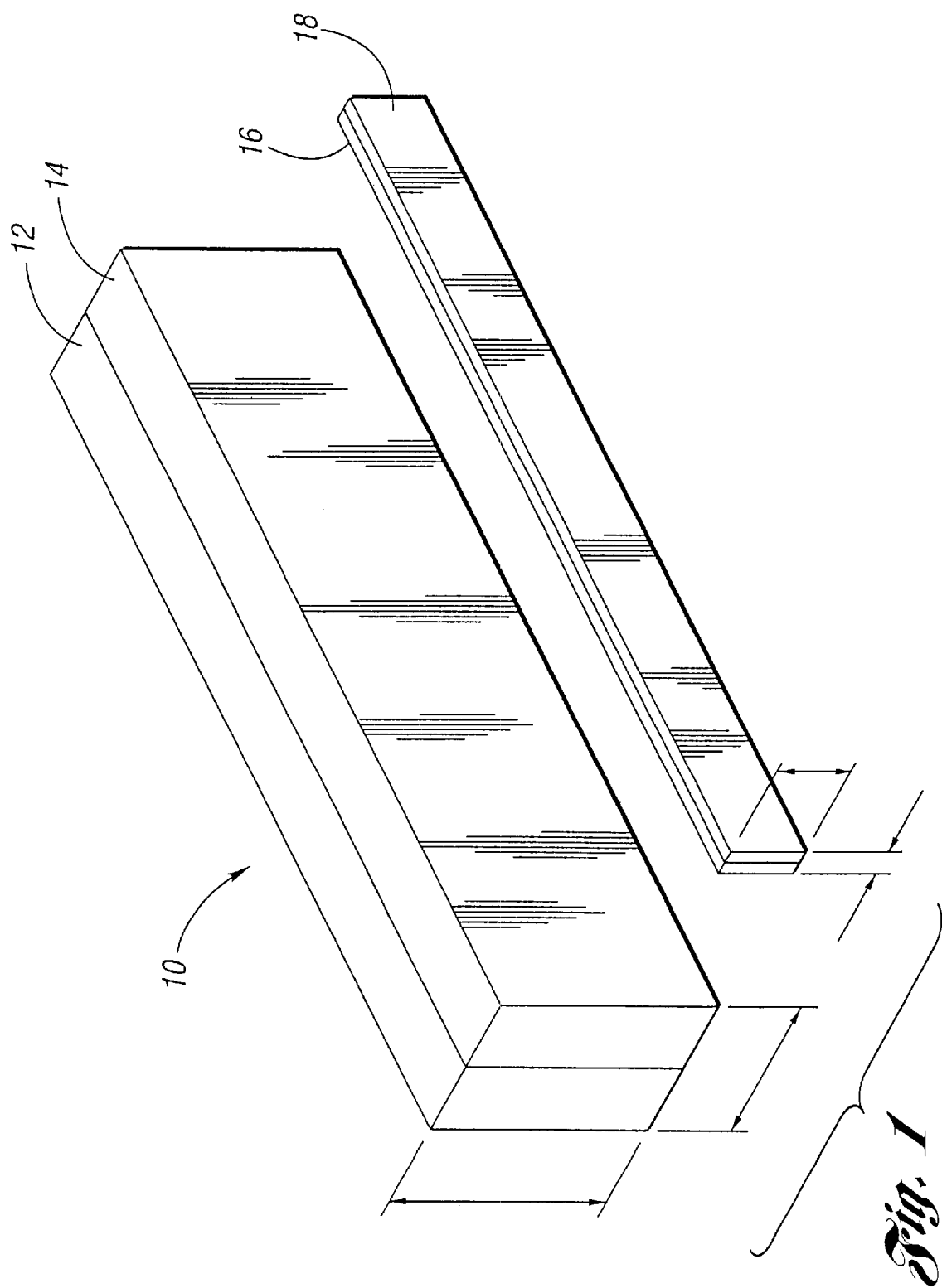
FIG. 1 illustrates the comparative size of a passively cooled bus bar pair with a evaporatively cooled 28 V DC bus bar pair that carries 1000 A.

The invention relates to a method for cooling a bus bar 10. As used herein, the term "bus bar" embraces one or more bus bars and their electrical equivalents. The method invokes the step of exposing the bus bar to an evaporative cooling system which is primed with a dielectric fluid having a sufficiently high breakdown voltage for the intended application (e.g., twice the voltage carried by the bus bar). The evaporative cooling system carries heat away from the electrical bus bar and increases its current-carrying capacity for a given temperature rise. Consequent reduction in the component's dimensions saves space and weight, so that the packaging density of the components may be increased.

The evaporative fluid is in fluid and thermal contact with the bus bar. The electrical fluid undergoes at least a partial phase change to the vapor state. During that process, latent heat of vaporization is extracted from the component.

In general, the factors that limit the current-carrying capacity of a bus bar are a function of the temperature rise in the bar and the increase in resistance due to heating from the flow of electrical energy. Higher temperatures can create a safety hazard and increased resistance to the flow of electrical current. This results in unacceptably high drops in current flow. The present invention aims to carry away the heat, thereby enabling an increase in the amount of current that a given bar can carry for a given temperature rise.

Preferably, the fluid is a dielectric fluid having a sufficiently high breakdown voltage. As is known, a dielectric is a substance with very low electrical conductivity, i.e., is an insulator. Liquid dielectrics include hydrocarbon oils, askarel, and silicone oils. As used herein, the term "breakdown voltage" refers to the maximum voltage that the dielectric can withstand without breakdown. Beyond that voltage, considerable current passes as an arc, usually with more or less decomposition of the fluid along the path of the current.

Preferably, the evaporative fluid of the subject invention is a thermally stable liquid, such as a perfluorocarbon. One example is the Fluorinert™ electronic liquid FC-77 that is available from the 3M Company of Minneapolis, Minn. An alternative dielectric is sold under the name Flutec™ which is manufactured by F2 Chemicals Limited of Lancashire, England. The inertness of such fluids permits their use as a direct contact, single and multiple phase coolant in the electrical environment. Their high dielectric strength and low electrical conductivity render them suitable for applications in high voltage transformers and power electronics. Ideally, such fluids have a low global warming potential and zero ozone-depletion potential.

In the environment under consideration, the evaporative fluid is dispensed in liquid droplets that impact upon the electrical components. Ideally, the temperature of the liquid droplets prior to impact is just below the fluid's boiling point. In this manner, at least a portion of the incident evaporative fluid becomes vaporized, with a desired efficiency of 15–20%. As defined in this disclosure, "efficiency" is defined as the ratio of the actual heat transferred to the theoretical maximum heat transfer. The theoretical maximum heat transfer is the sensible and latent heat associated with 100% vaporization of the liquid impacting the surface.

An acceptable temperature rise depends upon the application. For example, if the bus bar has a lacquer surface, an acceptable temperature rise might be up to about 165° F. Up to that temperature, the lacquer-covered bus bar retains its structural integrity without drooping. If a bus bar is rubber-coated, an acceptable temperature would be below that at which degradation of the rubber or other insulating layer occurs.

For example, consider a 1,000 amp bus bar (FIG. 1). Using traditional passive cooling approaches, each bus bar 12,14 in the pair would need to be about 0.5 by about 1.8 inches in order to carry this current with an acceptable temperature rise, i.e., a temperature that can be controlled by natural convection in air. A major factor governing its size is the ability to dissipate heat that is generated, with an acceptable temperature rise. Using an evaporatively cooled bus bar, the size of each bar 16,18 in the pair to carry this current would be about 0.06 by 0.64 inches for a 28 volt DC bus bar. This equates to a reduction in size and weight of over 24:1. With cooling alone as the governing parameter, size reductions of the order of 100:1 can be achieved. With this significant reduction in size and weight, packaging options for power distribution are expanded.

As the bus bar gets smaller, with heat dissipation no longer a significant issue, voltage drop actually becomes the controlling factor in sizing the bus bars. Lower voltage bus bars are more sensitive to this voltage drop factor. If 0.5% is considered an acceptable voltage drop, then for a 28 volt DC bus bar, as depicted, the acceptable drop is 0.14 volts. With a 270 volt DC bus bar, the allowable drop is 1.35 volts. The voltage drop then becomes a governing factor in determining the cross sectional area and the length.

In Table I, two different thicknesses of bus bar are considered in specimens having widths of 1, 2, 3, and 4 inches: first, a ⅛-inch thick bus bar; and second, a ½-inch thick bus bar. The empirically-derived data describe the current-carrying capability of bus bars with the dimensions shown. Also shown is the heat generated per unit length. Thus, Table I offers a benchmark comparison of the DC-carrying capacity for bus bars that are subjected to traditional cooling techniques, i.e., natural convection and radiant heat transfer. With the exception of heat generation data, Table I is taken from Electromechanical Design Handbook, R. Walsh, Tab. Prof'l & Ref. Books, p. 257 (1st edition).

The data of Table II evaluate the effect of evaporative cooling using 3M's Fluorinert™ (FC-72), which has a boiling point of 56° C. The observations assumed that (1) a conservative heat flux of 160 W per square inch prevailed; and (2) only 10% of FC-72 vaporized when the component was cooled. The current-carrying capacity for various sizes of bus bar was determined with widths ranging from 0.05 to 0.8 inches and a thickness of 0.06 inch.

In Table I, consider the case where the bus bar is 0.5-inch thick and 2-inches wide. This is the closest case to the illustration of FIG. 1 (each bar in the pair 12,14 being 0.5-inch thick and 1.8-inch wide). The current-carrying capacity that is shown in Table I is 1040 amps (traditional cooling).

In Table II, consider the case of a 0.06-inch thick bus bar that is evaporatively cooled. The width is specified. At about 0.6 inches in width, the maximum current capacity for a 28 volt bar (8 inches in length) is 945 amps.

That value is fairly close to the non-evaporatively cooled bus bar. It affords a comparison between the size and volume of a naturally convection-cooled bus bar and an evaporatively-cooled bus bar. The natural convection-cooled bus bar that carries the same current is 0.5 inch by 2-inches. The evaporatively-cooled bus bar is 0.06-inch by 0.6-inch— which is much smaller and lighter in weight.

Figure 2:
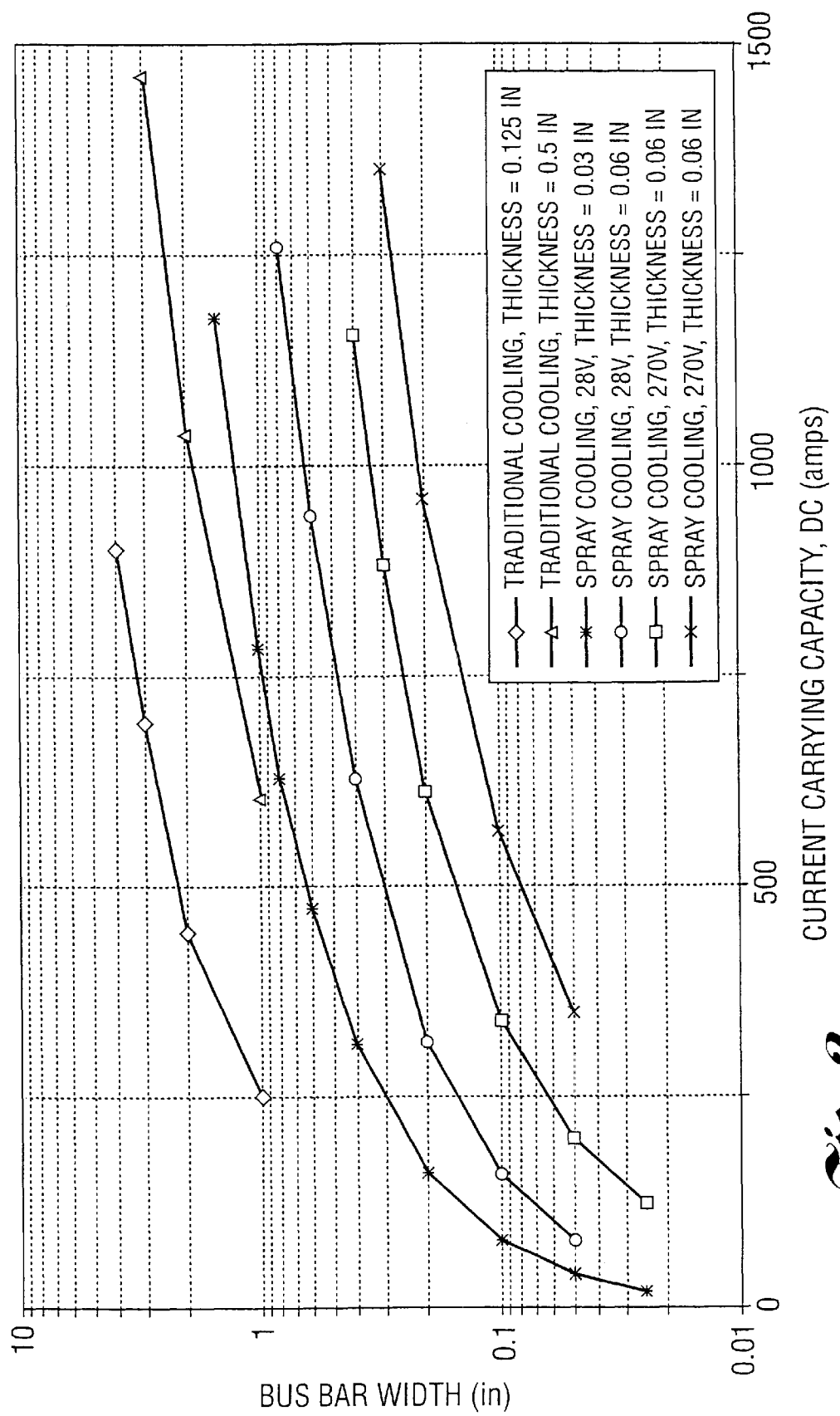
FIG. 2 is a graph of current-carrying capacity against bus bar width in traditional and evaporative cooling environments for various thicknesses of bus bar.

Turning now to FIG. 2, the current-carrying capacity of a bus bar under various loads is shown. FIG. 2 portrays the bus bar widths for a given thickness and voltage under traditional and evaporative cooling conditions. The data reveal that utilizing evaporative (spray) cooling, equivalent currents can be carried by bus bars which are smaller in width and thickness.

TABLE I

DC CARRYING CAPACITY FOR BUS BARS (TRADITIONAL COOLING)

| Bus Bar Width (in) | 1 | 2 | 3 | 4 | 1 | 2 | 3 | 4 |
| --- | --- | --- | --- | --- | --- | --- | --- | --- |
| Bus Bar Thickness (in) | 0.125 | 0.125 | 0.125 | 0.125 | 0.5 | 0.5 | 0.5 | 0.5 |
| Current (A) | 245 | 445 | 695 | 900 | 605 | 1040 | 1460 | 1860 |
| Heat Generation (W/in) | 0.320 | 0.528 | 0.859 | 1.080 | 0.488 | 0.721 | 0.948 | 1.154 |

TABLE II

SUMMARY OF EVAPORATIVE COOLING DATA

| Bus Bar Dimensions (in) | 0.06 × 0.05 | 0.06 × 0.10 | 0.06 × 0.20 | 0.06 × 0.30 | 0.06 × 0.40 | 0.06 × 0.60 | 0.06 × 0.80 |
| --- | --- | --- | --- | --- | --- | --- | --- |
| Bus Bar Width (in) | 0.05 | 0.10 | 0.20 | 0.30 | 0.40 | 0.60 | 0.80 |
| Resistance (Ω/in) | 2.22E−04 | 1.11E−04 | 5.56E−05 | 3.71E−05 | 2.78E−05 | 1.85E−05 | 1.39E−05 |
| Heat Generation (W/in) | 27.4 | 35.5 | 51.6 | 67.7 | 83.9 | 116.1 | 148.4 |
| DC Carrying Capacity (A) — Limited by Evaporative Cooling | 351 | 565 | 964 | 1350 | 1740 | 2500 | 3270 |
| Voltage Drop (mV/in) | 78.1 | 62.8 | 53.6 | 50.1 | 48.3 | 46.4 | 45.4 |
| Maximum Current (A) — 28 V, 8 in bar with 5% Voltage Drop | 78.7 | 157 | 315 | 472 | 630 | 945 | 1260 |
| Maximum Current (A) — 270 V, 8 in bar with 5% Voltage Drop | 759 | 1520 | 3040 | 4550 | 6070 | 9110 | 12100 |

TABLE II-continued

SUMMARY OF EVAPORATIVE COOLING DATA

| Bus Bar Dimensions (in) | 0.06 × 0.05 | 0.06 × 0.10 | 0.06 × 0.20 | 0.06 × 0.30 | 0.06 × 0.40 | 0.06 × 0.60 | 0.06 × 0.80 |
|---|---|---|---|---|---|---|---|
| Required Liquid Flow Rate (g/in-s) | 2.30 | 2.97 | 4.33 | 5.68 | 7.03 | 9.74 | 12.44 |
| Required Volume Flow Rate (ml/min-in) | 82.1 | 106 | 155 | 203 | 251 | 347 | 444 |

Percent Mass Vaporized: 10%
Fluid Temperature rise: 3° C.
Heat of Vaporization, FC-72: 87.9 J/g
Specific Heat: 1.05 J/g ° C.
Density, FC-72: 27.5 g/in$^3$
Assumed Heat Flux: 160 W/in$^2$ While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for increasing the capacity of a bus bar to carry an electrical current, comprising the steps of:

exposing the bus bar to an evaporative, dielectric fluid in the form of a fluid stream having a state selected from the group consisting of a liquid, a droplet, a vapor, and mixtures thereof, a portion of the liquid and the droplet vaporizing upon impact with the bus bar, the evaporative, dielectric fluid being in fluid and thermal communication with the bus bar and having a relatively uniform distribution of the evaporative, dielectric fluid across a surface of the bus bar to which the evaporative, dielectric fluid is directed, a portion of the fluid undergoing a phase change to a vapor state, the bus bar having a warm surface with a temperature that exceeds the boiling point of the fluid that heats the fluid to its vaporization point, so that upon vaporization, an amount of heat is extracted from the bus bar, thereby cooling the bus bar and increasing the capacity of a given size of bus bar to carry the electrical current without a temperature increase which exceeds a desired temperature rise.

2. The method of claim 1, wherein the evaporative fluid has a breakdown voltage that is up to about twice the voltage carried by the bus bar.

3. The method of claim 1 wherein the evaporative fluid is selected from the group consisting of hydrocarbon oils, askarel, and silicone oils.

4. The method of claim 1 further including the step of providing liquid droplets of the evaporative fluid, the temperature of the liquid droplets prior to impact upon the bus bar being just below their boiling point so that at least a portion of the incident evaporative fluid becomes vaporized.

5. The method of claim 4 wherein the ratio of actual heat transferred to a theoretical maximum amount of heat transferred is about 15–20%.

6. A method for packaging bus bars with an associated cooling system, comprising:

exposing the bus bars to an evaporative, dielectric fluid which serves as a coolant that transfers heat away from the bus bars and increases their current-carrying capacity within a given temperature rise, thereby enabling a smaller bus bar to carry a given current and thereby saving space and weight, so that the packaging density of the electronic system is increased.

7. A method for downsizing an electrical power distribution system including one or more bus bars, comprising the steps of:

determining a desired current-carrying capacity of the bus bars;

determining an acceptable temperature rise of the bus bars;

determining for a given bus bar thickness a suitable bus bar width; and determining the flow rate required of an evaporative dielectric cooling fluid that enables the bus bars to carry the desired current.

* * * * *